2 Sheets—Sheet 1.

J. H. MEYER.
FLOWER-BASKET.

No. 177,653. Patented May 23, 1876.

WITNESSES
Nat. E. Oliphant,
T. D. Durand.

INVENTOR
John H. Meyer
per Chas. H. Fowler,
Attorney.

2 Sheets—Sheet 2.

J. H. MEYER.
FLOWER-BASKET.

No. 177,653. Patented May 23, 1876.

WITNESSES
Nat. E. Oliphant,
F. R. Wagner.

INVENTOR
John H. Meyer,
per Chas. H. Fowler,
Attorney.

N. PETERS, PHOTO-LITHOGRAPHER, WASHINGTON, D. C.

UNITED STATES PATENT OFFICE.

JOHN HENRY MEYER, OF MOBERLY, MISSOURI.

IMPROVEMENT IN FLOWER-BASKETS.

Specification forming part of Letters Patent No. 177,653, dated May 23, 1876; application filed March 10, 1876.

*To all whom it may concern:*

Be it known that I, JOHN HENRY MEYER, of Moberly, in the county of Randolph and State of Missouri, have invented a new and valuable Improvement in Flower-Baskets; and I do hereby declare that the following is a full, clear, and exact description of the construction and operation of the same, reference being had to the annexed drawings, making a part of this specification, and to the letters and figures of reference marked thereon.

Figure 1:
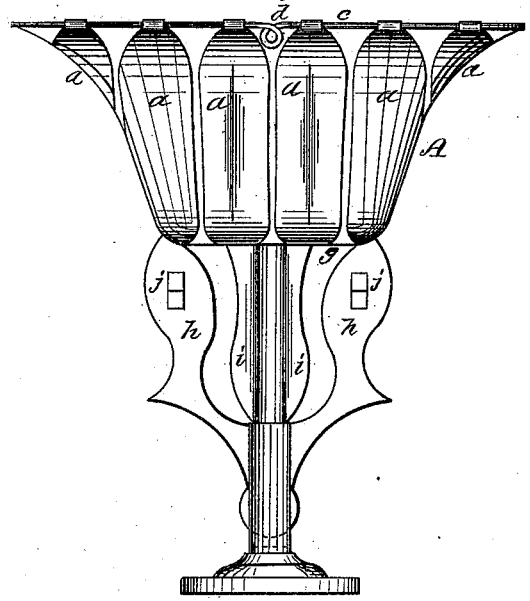
Figure 2:
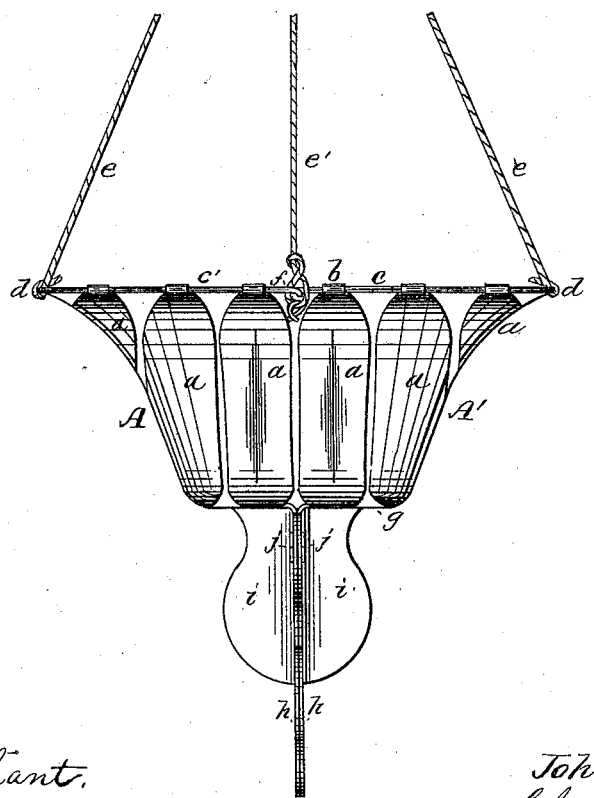
Figure 3:
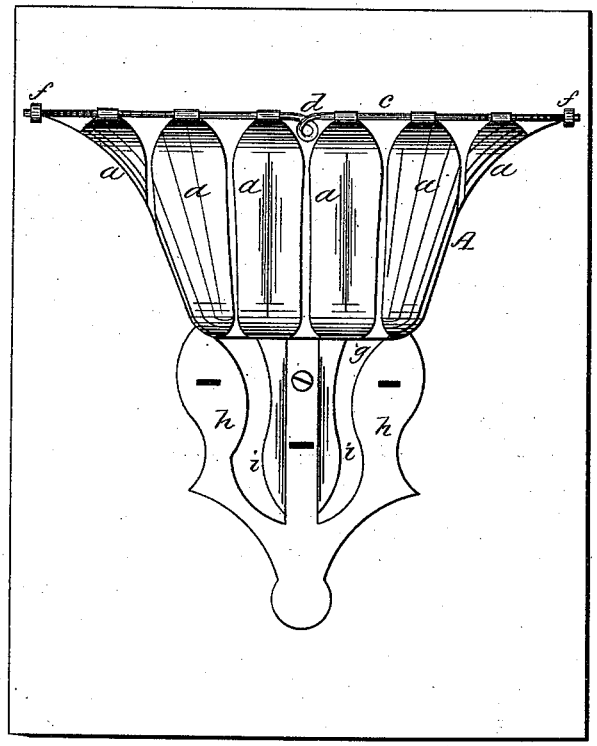
Figure 4:
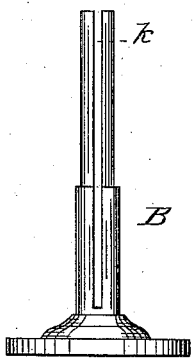

Figure 1 of the drawing is a representation of a perspective view of my invention when used as a flower-stand. Fig. 2 is a similar view of my invention when used as a suspension flower-basket. Fig. 3 is a front elevation of my invention, showing it when used as a bracket or wall-basket. Fig. 4 is a detached view of the pedestal or support, which, together with the basket, forms the flower-stand.

This invention has relation to flower stands and baskets; and consists in constructing the several parts composing the flower-stand in such a manner that they may be disconnected to form a suspension-basket, or wall or bracket basket, as circumstances may require.

In the accompanying drawings, the basket is shown as being made in two sections, A A', and may be of any suitable form or design, and of any suitable material. In this instance, however, I have shown it as being made of metal strips $a$, stamped from semicircular disks of metal, and bent around to the form shown. The ends of the strips are retained in their relative position by a flange, $b$, formed thereon, and which is bent around two sections of wire, $c\ c'$. These wires $c\ c'$, equidistant from their ends, have a loop or eye, $d$, for attaching the cords or chains $e$, and at each end of the wires are double loops $f$, by which the two ends are locked together, and also forming an eye for the attachment of additional cords or chains $e'$. In stamping out the strips $a$ sufficient metal is left at the center so that when the strips are bent up in the desired form a bottom, $g$, is formed for the basket.

To make the basket more ornamental in design, and to facilitate the connecting of the several parts together, there is stamped, or otherwise formed, of sheet metal, or any other desired material, arms $h$ and wings $i$, the latter being bent at an angle to said arms, after which they are secured to the bottom of the basket.

When the sections A A' are brought together, and the ends of the wires $c\ c'$ locked, the arms $h$ of the sections are fastened together by bands $j$, or any other form of fastening found most convenient for the purpose, thereby making a very perfect connection of the two sections A A' when it is desired to use it as a suspension-basket; but when a basket to be placed against the wall or bracket, or other suitable base, as illustrated in Fig. 3, the two sections A A' are separated or taken apart by unlocking the ends of the wires $c\ c'$, and removing the fastenings which connect the arms $h$, when either or both of the sections may be used.

When it is desired to convert the basket into a flower-stand, a pedestal, B, is used, the same having an elongated slot, $k$, through which the junction of the arms $h$ are inserted. It is evident, however, that the pedestal may be formed so as to connect it to the basket in various ways by set-screws, clamping-plates, or other simple means of fastening.

The pedestal B may be, if desired, rigidly connected to the basket and made in sections, so that when the two sections A A' are separated each section of the pedestal will form an additional ornament for the bottom of the wall or bracket basket.

It will be seen from my invention that a single device, such as a flower-stand, may be readily made to serve the purpose of a hanging or suspension basket, or a flower-basket, capable of being secured to any convenient flat surface, such as a panel, or to the wall or a bracket.

I do not wish to be understood as confining myself to any particular construction or form of basket, or to the manner of connecting the two sections together, or to the form of and the manner of attaching the pedestal, as all these mechanical arrangements of the several parts may be variously changed or modified without departing from the purpose of my invention.

Having now fully described my invention, what I claim as new, and desire to secure by Letters Patent, is—

1. A flower-basket, having a detachable support or pedestal for converting the basket into a flower-stand or suspension-basket, substantially as and for the purpose set forth.

2. A suspension-basket or flower-stand, in which the basket or receptacle for holding flowers is made in sections for converting the flower-stand or suspension-baskets into one or more wall or bracket baskets, substantially as and for the purpose specified.

3. A combined flower-stand, suspension-basket, and wall or bracket basket, consisting of the sections A A', formed of the strips $a$ and the wire $c\ c'$, connected to said strips by flanges $b$, and to each other by loops $f$, and the arms $h\ h$ and wings $i\ i$ connected to the bottom of said basket and the pedestal B, substantially as and for the purpose described.

In testimony that I claim the above I have hereunto subscribed my name in the presence of two witnesses.

JOHN HENRY MEYER.

Witnesses:
O. T. ROUSE,
CHAS. W. OAK.